United States Patent
Kinch et al.

(10) Patent No.: US 9,803,637 B2
(45) Date of Patent: Oct. 31, 2017

(54) VARIABLE DISPLACEMENT HYDRAULIC PUMP CONTROL

(75) Inventors: Derek Kinch, Ypsilanti, MI (US); Mark R. Dobson, Howell, MI (US); Lev Pekarsky, W. Bloomfield, MI (US); Hrudaya Mahapatro, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 766 days.

(21) Appl. No.: 13/182,647

(22) Filed: Jul. 14, 2011

(65) Prior Publication Data

US 2013/0014498 A1    Jan. 17, 2013

(51) Int. Cl.
*F16H 61/00* (2006.01)
*F04C 2/344* (2006.01)
*F04C 14/22* (2006.01)

(52) U.S. Cl.
CPC .......... *F04C 2/3442* (2013.01); *F04C 14/226* (2013.01); *F16H 61/0021* (2013.01); *F04C 2270/585* (2013.01); *F16H 61/0025* (2013.01); *Y10T 137/0402* (2015.04)

(58) Field of Classification Search
CPC ........ F04B 49/125; F04B 49/123; F04B 1/08; F04B 1/07; F04C 2/3442
USPC .............................. 60/452, 418, 445; 92/12.1
See application file for complete search history.

(56) References Cited

U.S. PATENT DOCUMENTS

| | | | |
|---|---|---|---|
| 3,924,410 A * | 12/1975 | Cornell et al. | 60/403 |
| 4,283,970 A * | 8/1981 | Vukovich | 477/161 |
| 4,468,173 A * | 8/1984 | Dantlgraber | F04B 49/08 417/220 |
| 4,631,005 A * | 12/1986 | Warren et al. | 417/218 |
| 4,693,081 A * | 9/1987 | Nakamura et al. | 60/448 |
| 5,103,930 A * | 4/1992 | Gierer | 180/249 |
| 5,718,115 A * | 2/1998 | Burkner | 60/413 |
| 5,884,480 A * | 3/1999 | Dahl | F04B 49/08 60/445 |
| 2010/0254828 A1* | 10/2010 | Frait | 417/53 |

FOREIGN PATENT DOCUMENTS

CN   101858340 A   10/2010

* cited by examiner

*Primary Examiner* — Logan Kraft
*Assistant Examiner* — Abiy Teka
(74) *Attorney, Agent, or Firm* — James Dottavio; MacMillan, Sobanski & Todd, LLC

(57) ABSTRACT

A system controlling pressure in a transmission including a variable displacement pump, a circuit carrying fluid from the pump to the transmission, a valve using fluid in said circuit to regulate pressure that controls displacement of the pump, a source of control pressure including an accumulator, a first spring acting with said source causing the valve to change the regulated pressure, and a second spring acting with feedback pressure from said circuit to oppose said change.

20 Claims, 2 Drawing Sheets

VARIABLE DISPLACEMENT HYDRAULIC PUMP CONTROL

BACKGROUND OF THE INVENTION

1. Field of the Invention

This invention relates generally to control of a variable displacement hydraulic pump and more particularly to control of an eccentric rotor vane pump.

2. Description of the Prior Art

A variable displacement hydraulic pump provides variable flow rate output depending on the transmission system flow requirement, also known as "flow demand". Change of the flow output is achieved by changing displacement of the pump or volume of fluid transported from inlet to outlet per one revolution of the pump's input shaft. Flow output could be maintained constant when pump rotational speed increases.

Variable displacement hydraulic pumps are used for many automatic transmissions. Unlike a variable displacement hydraulic pump, another type of transmission pump, a gear pump, uses a fixed displacement that provides hydraulic flow directly proportional to pump's rotational speed.

The power hydraulics and control system for an automatic transmission require that flow rate supply (flow demand) be proportional to pressure required at a given temperature and not affected by pump speed.

System hydraulic pressure is regulated by an electronically controlled hydraulic valve and maintained by a hydraulic control system that exhausts an excess of hydraulic flow to transmission sump.

A difference between the hydraulic flow required and the delivered flow at pressure and temperature results in excessive hydraulic flow at pressure, thereby producing hydraulic losses that are proportional to pump's hydraulic output, which is proportional to pump speed.

SUMMARY OF THE INVENTION

A system controlling pressure in a transmission including a variable displacement pump, a circuit carrying fluid from the pump to the transmission, a valve using fluid in said circuit to regulate pressure that controls displacement of the pump, a source of control pressure including an accumulator, a first spring acting with said source causing the valve to change the regulated pressure, and a second spring acting with feedback pressure from said circuit to oppose said change.

No specially sized openings or bleed orifices in the control system's hydraulic passages are required to reduce hydraulic control system response time or to reduce hydraulic pressure instability.

Due to the elimination of control bleed orifices, hydraulic losses that would have required an increase of engine power to maintain hydraulic flow are reduced, thereby leads to increased fuel economy.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
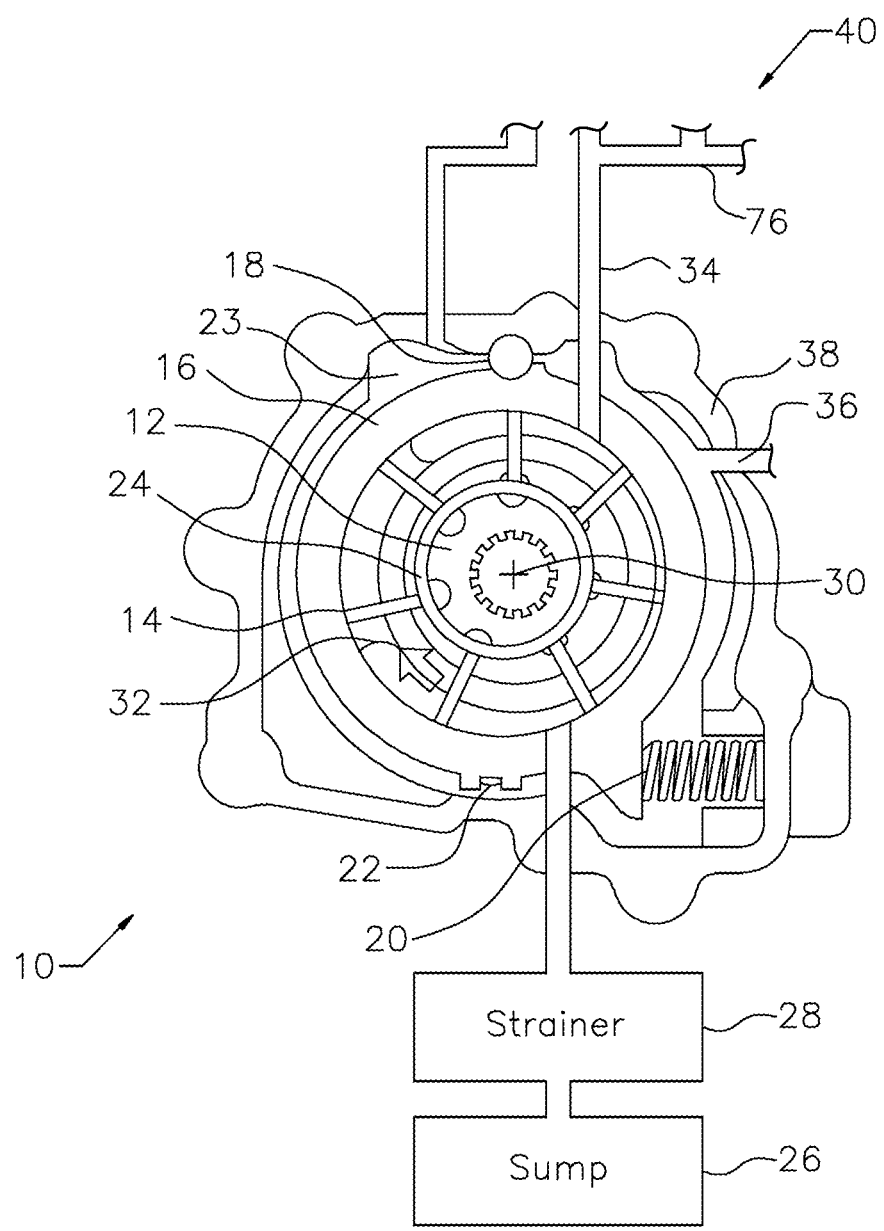
FIG. 1 is a cross section of a variable displacement vane pump.
Figure 2:
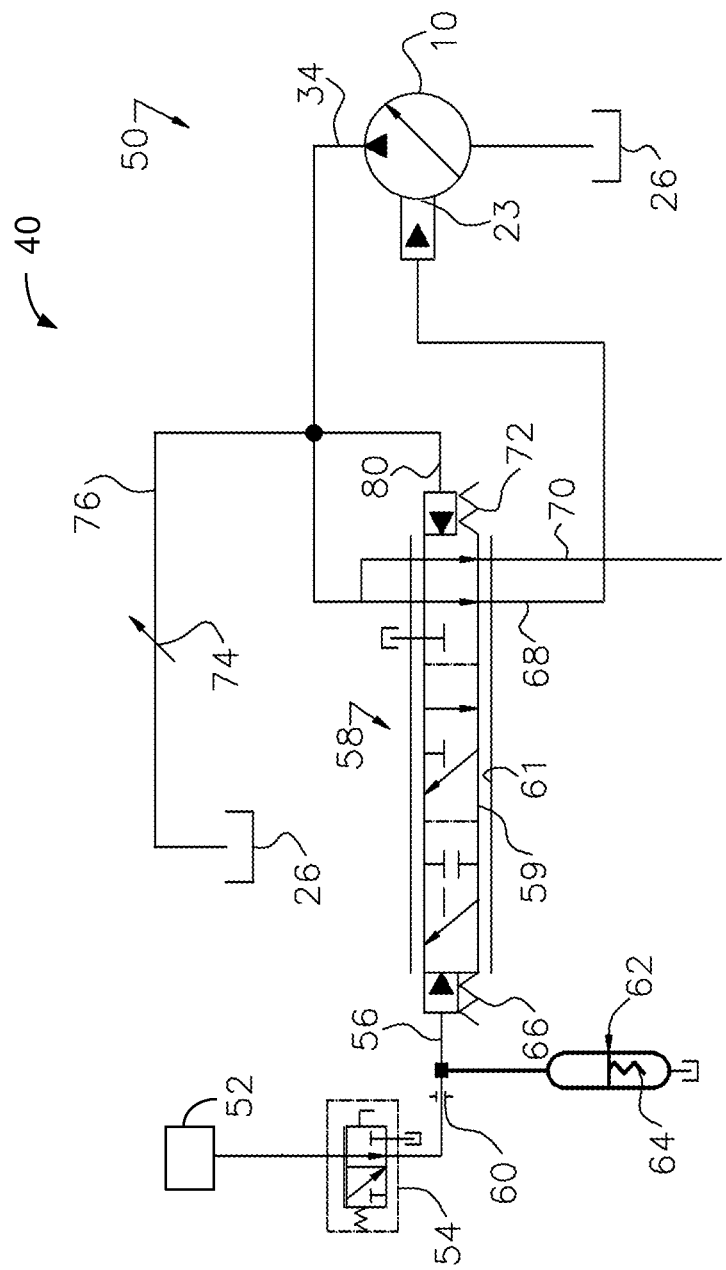
FIG. 2 is schematic diagram of a system for controlling a variable displacement vane pump for an automatic transmission.

Referring now to the drawings, there is illustrated in FIG. 1 a variable displacement hydraulic pump 10 for an automatic transmission, designated generally as 40 in FIGS. 1 and 2, of a motor vehicle.

A driven rotor 12 supports vanes 14, which are supported on the rotor to slide radially into contact with an eccentric moveable bore ring 16 surrounding the rotor. Displacement of the pump is reduced as the moveable bore ring 16 pivots at a pivot pin 18, decreasing its eccentric position relative to the driven rotor 12.

A force produced by a compression spring 20 and applied to the moveable bore tends to pivot the moveable bore ring 16 clockwise about pivot pin 18 to its maximum eccentricity, thereby tending to produce maximum pump displacement.

A hydraulic pressure in a sealed chamber 23, containing pressurized hydraulic fluid and extending counterclockwise circumferentially between pivot pin 18 and seal 22, opposes the force of spring 20 on the moveable bore ring 16, thereby tending to pivoting the moveable bore ring counterclockwise, reducing the eccentricity of the moveable bore ring 16 and thereby reducing the pump's volumetric displacement.

A vane ring 24 limits the inward radial travel of the vanes 14. Fluid flows from a sump 26 through a strainer 28 to the pump's inlet. The vanes 14 rotate clockwise about axis 30 drawing fluid from the inlet along an arcuate passage 32 in which the fluid is compressed and delivered though an outlet passage 34 to the transmission hydraulic system. Chamber 36 is volume extending clockwise circumferentially between pivot pin 18 and seal 22, exhausted through pump housing 38.

At the vehicle operating state in which pump 10 begins to produce more flow than is required to maintain the operating system's targeted pressure, the excess flow is redirected to the sealed chamber 23. As pressure begins to increase within the sealed chamber 23, the hydraulic force counteracting the spring 20 force begins to pivot the bore ring 16 counterclockwise about pivot pin 18, thereby reducing the pump's eccentricity and the flow the pump can deliver. When additional flow is required to maintain the system's operating pressure, flow to the sealed chamber 23 is reduced by the system pressure regulating valve 38, thereby reducing the force counteracting the spring 20. The moveable bore ring 16 changes position to equalize the forces, increasing the pump's flow to meet the additional flow demand.

The pump control system 50, shown in FIG. 2, includes a source 52 of solenoid feed pressure, a limited pressure derived from pump output pressure in line 34, which is line pressure.

A line pressure control solenoid 54, an electro-hydraulic device, controls pressure in a line pressure control (LPC) circuit 56, which connects the solenoid output and to the main regulator valve (MRV) 58. The LPC solenoid 54 is commanded electrically to output a specified pressure, which corresponds to a desired line pressure. A LPC orifice 60 is located in circuit 56.

A command rate limiter 62 is an accumulator, which communicates hydraulically through orifice 60 with the line pressure control solenoid 54 and contains fluid under pressure produced and maintained by a spring 64.

The MRV 58 includes a valve spool 59, displaceable along a valve chamber 61. A line pressure offset spring 66 establishes the minimum line pressure that can be achieved using the MRV 58. Pressure from the line pressure control source in circuit 56 produces a force on the left hand end of the spool 59 of MRV 58 in addition to the force of spring 66.

A decrease-line-pressure circuit 68 carries regulated pressure to chamber 23 of pump 10 for actuating the bore ring 16 in opposition to the force of spring 20.

A noise response reduction spring 72 applies a force to the right-hand end of the MRV 58 spool 59. Noise response reduction spring 72 has a spring constant sufficiently high to eliminate overtravel of spool, preferably in the range 3-7 N/mm.

Line pressure circuit 76 carries fluid at line pressure from the outlet 34 of pump 10 to the transmission's hydraulic actuation system, which returns fluid to sump 26. Feedback pressure in circuit 80 produces a force on the right-hand end of the spool 59 of MRV 58 in addition to the force of spring 72. The LPC pressure and the force of spring 66 are opposed by a pressure force from line pressure circuit 80 and the force of noise response reduction spring 72, resulting in balanced forces at a position of the MRV spool 59 that meters flow to line pressure decrease circuit 68.

A prioritized oil circuit 70 can be closed to reduce total flow load.

The transmission flow load 74 is the flow rate at line pressure required for current transmission operation, except the flow rate in prioritized circuit 70.

No orifice is used in the feedback pressure line 80 to the MRV 58, because orifice 60 is more effective at providing damping. Lag resulting in delayed response to a line pressure error would result if an orifice in feedback line 80 were present.

The LPC circuit orifice 60 provides damping for the MRV 58. Orifice 60, in conjunction with the command rate limiter 62, set the maximum rate at which the spool 59 of MRV 58 will move in response to a change in LPC pressure in circuit 56. A portion of the fluid flow throttled through the LPC circuit orifice 60 flows into the command rate limiter (CRL) 62, thereby requiring more flow to actuate MRV 58 and damping MRV movement.

Fluid, which is pushed toward LPC solenoid 54 when the spool of MRV 58 is moving leftward toward line pressure offset spring 66 to reduce line pressure, also flows into the CPL accumulator 62. This flow rate can often be greater than the flow rate that can readily flow through the LPC circuit orifice 60, or that can be rejected by LPC solenoid 54, resulting in a pressure buildup on LPC side of MRV 58 and holding line pressure higher than the commanded line pressure.

The noise response reduction spring 72 minimizes rightward displacement of the spool of MRV 58 away from line pressure offset spring 66. Spring 72 opposes excessive valve movement in response to noise in the pressure signals that would change flow load 74. This type of noise input to MRV 58 could result in large displacements of MRV due to (i) the speed discrepancy between MRV 58 and its displacement control mechanism, and (ii) the fact that MRV controls decrease pressure in circuit 68, but its feedback signal is line pressure in line 80. The function of noise response reduction spring 72 is essentially unidirectional.

In accordance with the provisions of the patent statutes, the preferred embodiment has been described. However, it should be noted that the alternate embodiments can be practiced otherwise than as specifically illustrated and described.

The invention claimed is:

1. A system controlling pressure in a transmission, comprising:
   a variable displacement pump;
   a spool valve hydraulically engaging the pump with regulated pressure directed from the spool valve to the pump that controls displacement of the pump;
   a circuit providing pressurized fluid from the pump to the transmission and to bias the spool valve in a first direction;
   an electronically controlled valve selectively providing hydraulic control pressure to the spool valve, biasing the spool valve in an opposed second direction;
   a first spring biasing the spool valve in the first direction; and
   a second spring biasing the spool valve in the second direction.

2. The system of claim 1, wherein the pump is a vane pump whose displacement changes in response to hydraulic pressure output by the spool valve.

3. The system of claim 1, including:
   a hydraulic line extending from the electronically controlled valve to the spool valve, an accumulator hydraulically connected only to the hydraulic line between the electronically controlled valve and the spool valve, with hydraulic fluid flowing between the electronically controlled valve and the spool valve actuating the accumulator.

4. The system of claim 3, wherein the accumulator includes:
   a chamber containing a fluid volume; and
   a third spring urging fluid to flow from the volume.

5. The system of claim 1, wherein the system includes no orifice through which fluid communicates from an outlet of the pump to the spool valve.

6. The system of claim 1, including:
   a hydraulic line extending from the electronically controlled valve to the spool valve, an accumulator hydraulically connected only to the hydraulic line between the electronically controlled valve and the spool valve, with hydraulic fluid flowing between the electronically controlled valve and the spool valve actuating the accumulator; and
   an orifice between the electronically controlled valve and the accumulator, such that all hydraulic fluid flowing from the electronically controlled valve to the spool valve flows through the orifice.

7. The system of claim 6, wherein the accumulator is adapted to contain at least a portion of fluid that flows from the spool valve toward the orifice.

8. The system of claim 1, wherein the pump further comprises:
   an inlet;
   an outlet;
   pumping chamber;
   a pivoting ring surrounding the pumping chamber;
   a fourth spring urging the ring to pivot the ring in opposition to the regulated pressure; and
   vanes carried on a rotor from the inlet, through the pumping chamber, to the outlet.

9. The system of claim 1, further comprising an orifice located between the electronically controlled valve and the spool valve, such that all hydraulic fluid flowing from the electronically controlled valve to the spool valve flows through the orifice.

10. A system controlling pressure in a transmission, comprising:
 a variable displacement pump;
 a spool valve hydraulically engaging the pump with regulated pressure directed from the spool valve to the pump that controls displacement of the pump;
 a circuit providing pressurized fluid from the pump to the transmission and to bias the spool valve in a first direction;
 an electronically controlled valve selectively providing hydraulic control pressure to the spool valve, biasing the spool valve in an opposed second direction;
 a hydraulic line extending from the electronically controlled valve to the spool valve, an accumulator hydraulically connected only to the hydraulic line between the electronically controlled valve and the spool valve, with hydraulic fluid flowing between the electronically controlled valve and the spool valve actuating the accumulator; and
 a first spring biasing the spool valve in the first direction.

11. The system of claim 10, including:
 an orifice between the electronically controlled valve and the accumulator, such that all hydraulic fluid flowing from the electronically controlled valve to the spool valve flows through the orifice.

12. The system of claim 10, wherein the accumulator includes:
 a chamber containing a fluid volume; and
 an accumulator spring urging fluid to flow from the volume.

13. The system of claim 12 including a second spring biasing the spool valve in the second direction.

14. The system of claim 10, wherein the accumulator is adapted to contain at least a portion of fluid that flows from the spool valve toward the electronically controlled valve.

15. The system of claim 10, wherein the system includes no orifice through which fluid communicates from an outlet of the pump to the spool valve.

16. The system of claim 10, wherein the pump is a vane pump whose displacement changes in response to hydraulic pressure output by the spool valve.

17. The system of claim 10, wherein the pump further comprises:
 an inlet;
 an outlet;
 pumping chamber;
 a pivoting ring surrounding the pumping chamber;
 a pump spring urging the ring to pivot the ring in opposition to the regulated pressure; and
 valves carried on a rotor from the inlet, through the pumping chamber, to the outlet.

18. A method for controlling pressure in a transmission, comprising:
 activating a variable displacement pump;
 using a spool valve to regulate pressure in a hydraulic line extending from the spool valve to the pump to control displacement of the pump whose output is connected to the transmission and the spool valve to bias the spool valve in a first direction;
 selectively actuating an electronically controlled valve to provide a source of control pressure;
 using a first spring and the source of control pressure to cause the spool valve to move in the second direction, effecting a change in the pump displacement; and
 a second spring engaging the spool valve to bias the spool valve toward the first direction, with the second spring and pressure at the outlet of the pump opposing movement in the second direction.

19. The method of claim 18, further comprising:
 using a hydraulic line extending from the electronically controlled valve to the spool valve and an accumulator hydraulically connected only to the hydraulic line, located between the electronically controlled valve and the spool valve, with hydraulic fluid flowing between the electronically controlled valve and the spool valve actuating the accumulator, to contain at least a portion of fluid that flows from the spool valve toward the electronically controlled valve.

20. The method of claim 18, further comprising:
 locating an orifice between the electronically controlled valve and the spool valve, such that all hydraulic fluid flowing from the electronically controlled valve to the spool valve flows through the orifice; and
 using an accumulator to contain at least a portion of the fluid that flows through the orifice.

* * * * *